Dec. 29, 1925.
E. E. ANDERSON
EGG DIPPING MACHINE
Filed Oct. 8, 1925     3 Sheets-Sheet 1
1,567,563
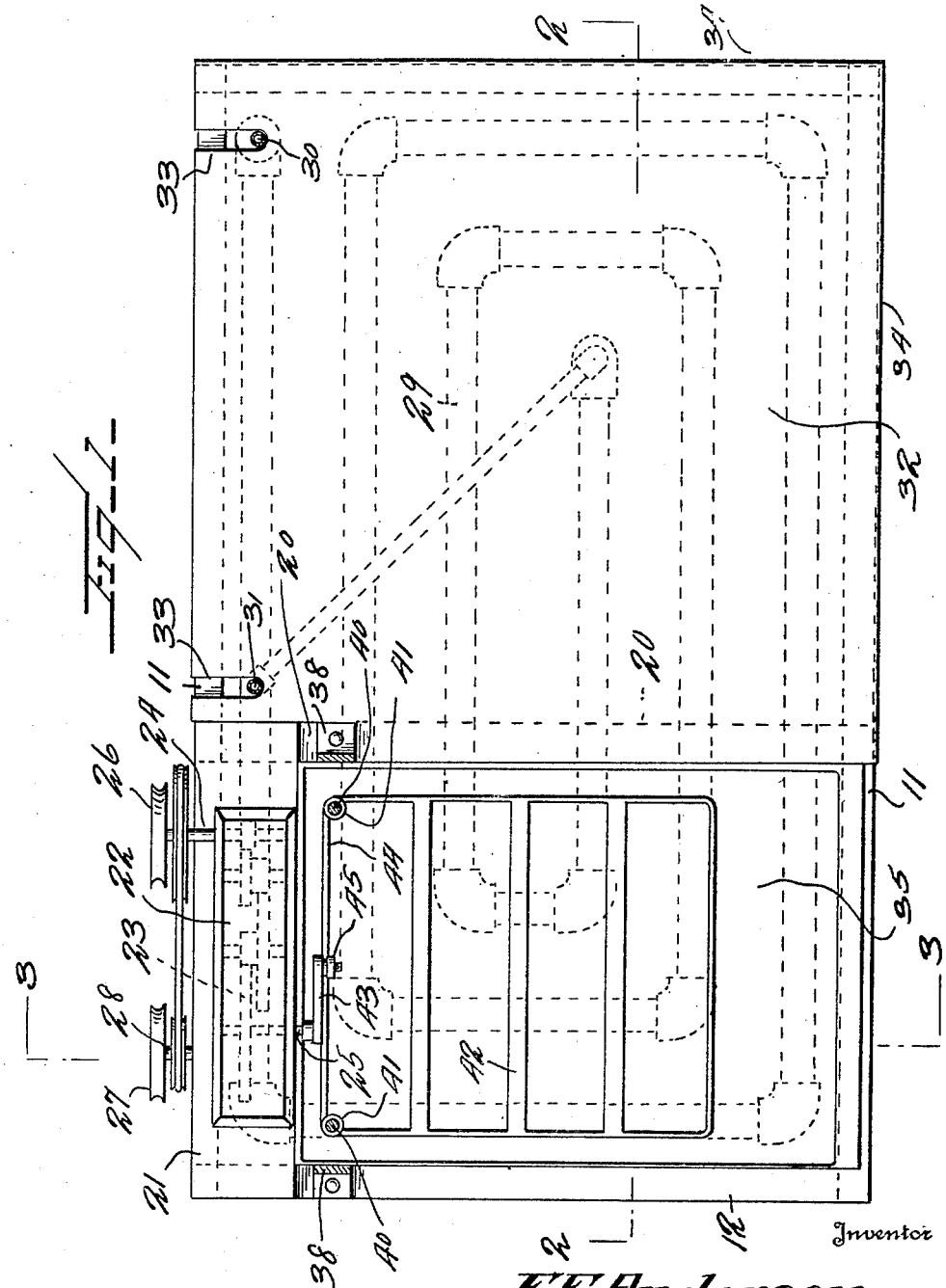
Inventor
E.E. Anderson
By Watson E. Coleman
Attorney

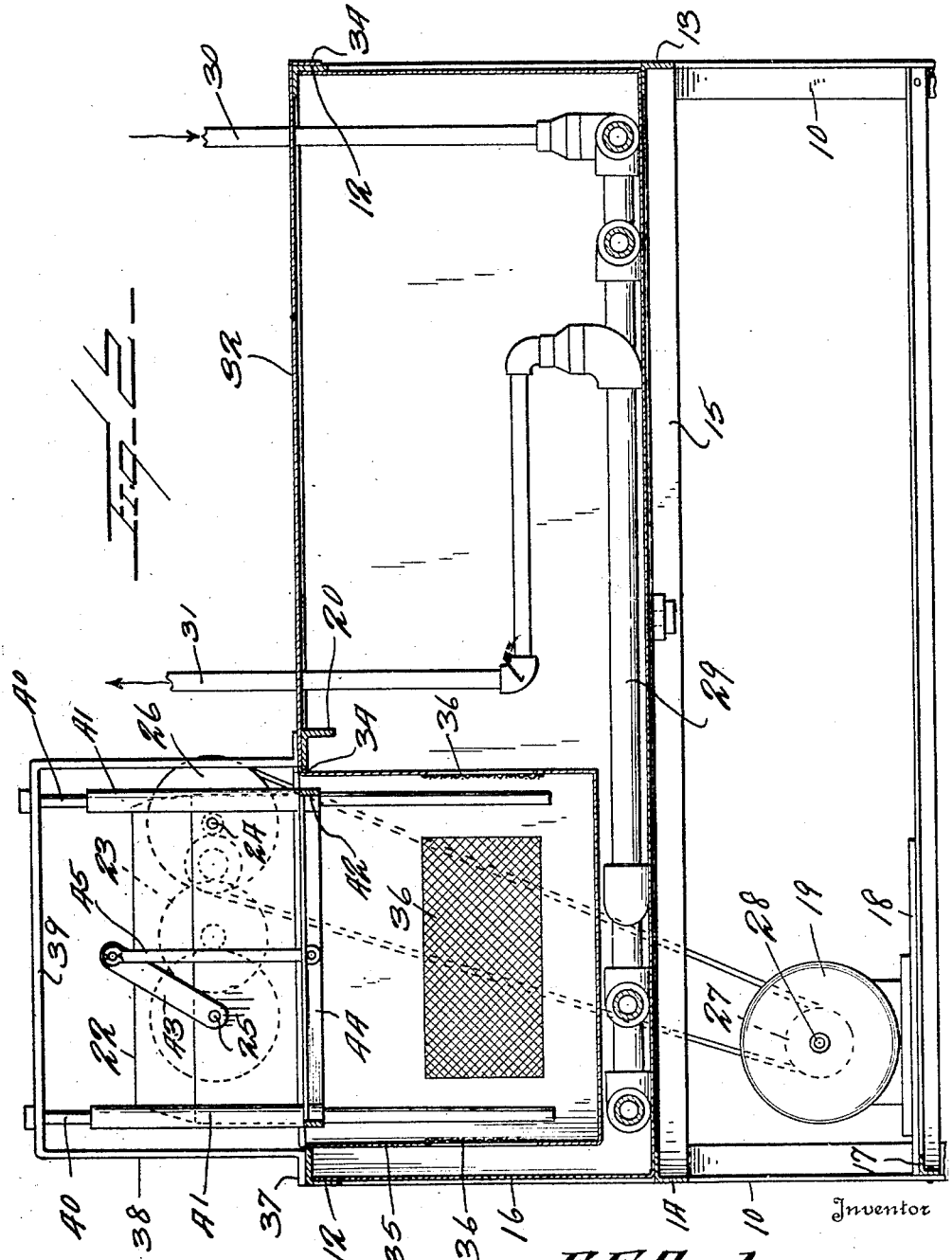

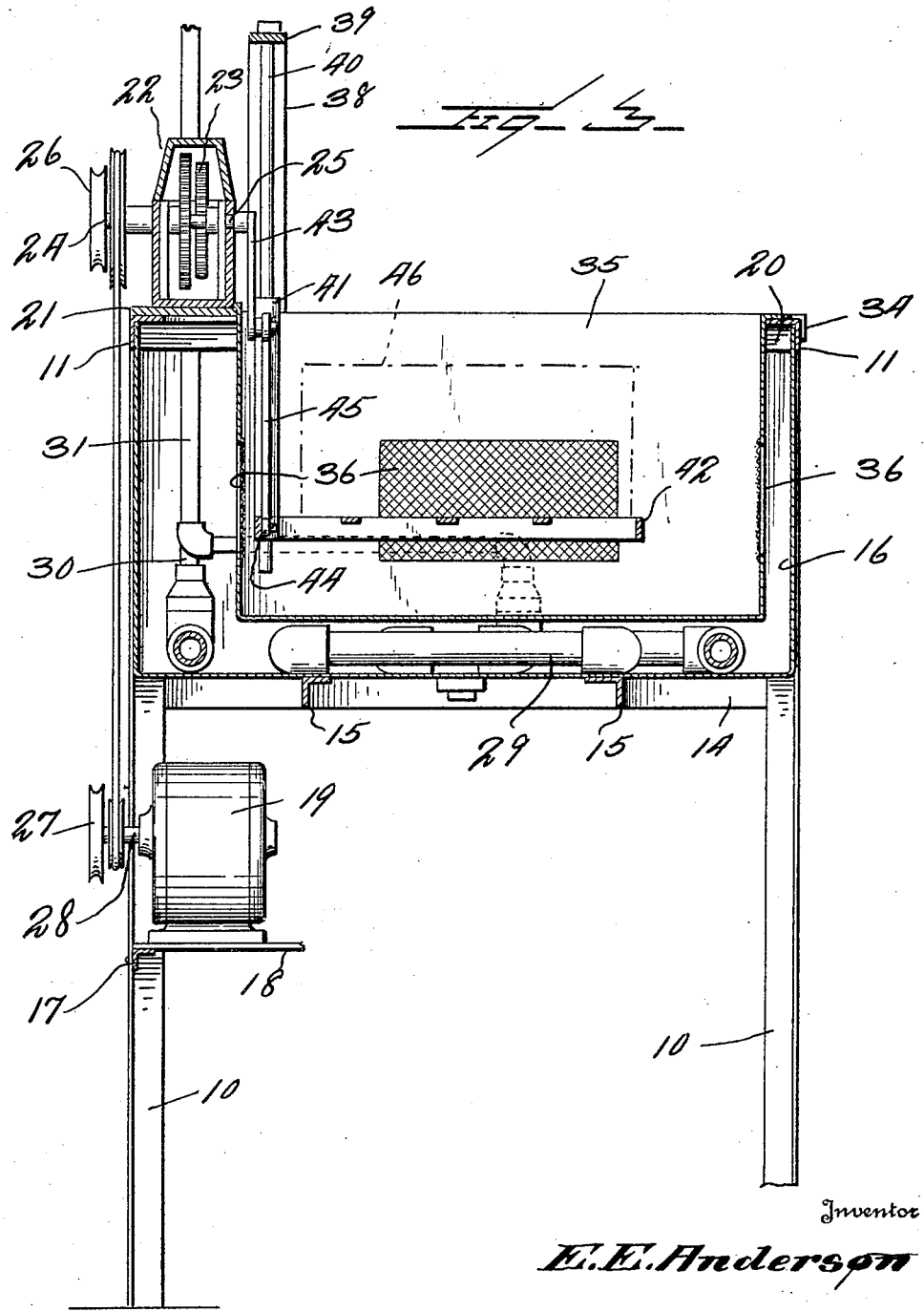

Patented Dec. 29, 1925.

1,567,563

UNITED STATES PATENT OFFICE.

ELMER E. ANDERSON, OF LA GRANDE, OREGON.

EGG-DIPPING MACHINE.

Application filed October 8, 1925. Serial No. 61,288.

*To all whom it may concern:*

Be it known that I, ELMER E. ANDERSON, a citizen of the United States, residing at La Grande, in the county of Union and State of Oregon, have invented certain new and useful Improvements in Egg-Dipping Machines, of which the following is a specification, reference being had to the accompanying drawings.

This invention relates to an egg dipping machine and more particularly to a machine for dipping eggs in oil to thereby form interiorly of the shell of the egg a protective film acting to preserve the egg.

An important object of the invention is to provide a device of this character by which the dipping process is facilitated and rendered very simple.

A further object of the invention is to provide a device of this character which provides means whereby a dipping device in constant operation may be governed to vary the periods of immersion so that the apparatus may be employed with eggs, the shells of which vary in texture and thickness. A further purpose of the change of speed is to adjust the machine to the skill of the operator so that a slow operator may have time to feed the machine without missing and so that the speed may be increased as the operator becomes more skilled, enabling the operator to get as high rate of output as his skill may permit. With the increase of speed there must be an increase of heat in a corresponding way.

It is well known that the eggs of one class of fowls are thicker and less porous than the eggs of other classes and it will be obvious that in a process where penetration of this shell is necessary, the duration of the period of submergence of the eggs must be varied in order to provide the same coating upon two eggs belonging to these various types.

Another and important object of the invention is to provide a device of this character having a main tank for containing the fluid in which the eggs are to be dipped and an auxiliary tank arranged within the main tank and in which the actual dipping of the eggs takes place, this auxiliary tank being so constructed that is prevents intermingling with the fluid in the tank or any particles of dirt, egg shells or the like which may become separated from the eggs during the dipping process.

A further object of the invention is to provide a continuously operated platform moving into and out of the treating solution and having its upper surface at the upper limit of its travel flush with the platform formed upon the upper surface of the tank containing the solution so that the egg containers carried by this platform may be readily slid therefrom and replaced by other egg containers to be dipped.

These and other objects I attain by the construction shown in the accompanying drawings, wherein for the purpose of illustration is shown a preferred embodiment of my invention and wherein:—

Figure 1 is a plan view of an egg dipping machine constructed in accordance with my invention;

Figure 2 is a longitudinal sectional view therethrough taken on the line 2—2 of Figure 1;

Figure 3 is a transverse sectional view therethrough taken on the line 3—3 of Figure 1.

Referring now more particularly to the drawings, the numeral 10 indicates angle iron corner posts arranged in the form of a rectangle and connected at their upper ends by angle iron side and end framing pieces 11 and 12. Intermediate their ends, other side and end framing pieces 13 and 14 are provided, the end framing pieces 14 being connected by longitudinally extending frame pieces 15 to thereby provide a grid forming a seat for the bottom of a tank 16, the corners of which extend into the angles of the angle iron corner posts 10. Beneath the tank adjacent one end thereof the corner posts are provided with supports 17 for a motor base 18 having mounted thereon a motor 19, the purpose of which will presently appear.

Adjacent the same end of the tank, the angle iron side members 11 are connected by a transverse angle iron brace 20 which, at one side of the tank, forms a support for one end of a plate 12, the opposite end of which is supported by the adjacent end member 12. Upon this plate is arranged a housing 22 containing reduction gear train 23. The train includes input and output shafts 24 and 25 and the shaft 24 has mounted thereon a plurality of pulleys 26 of different sizes and aligning with corresponding pulleys 27 mounted upon the armature shaft 28 of the motor 19.

Arranged in the bottom of the tank is a flat radiator coil 29, the inlet and outlet pipes 30 and 31 of which project upwardly from the tank adjacent one side thereof. A cover 32 is provided for that portion of the tank 16 between the cross member 20 and the remote end member 12 of the upper frame structure, this cover being notched to permit its application and removal over the pipes 30 and 31, as indicated at 33. The edges of the cover are provided with flanges 34 for engaging the side members 11, end member 12 and the cross member 20 so that this cover will very be firmly held in position.

Supported between the inner edge of the plate 21 and the remote side member 12 is a removable dipping tank 35 rectangular in form and of such depth that when in applied position, it extends to a point immediately above the upper surface of the flat coil 29. The side and end walls of this tank are provided with screened openings 36, the lower edges of which are spaced above the bottom of the tank which is solid for a purpose presently to appear.

Immediately adjacent the inner edge of the plate 21, the end member 12 and cross brace 20 supporting this plate receive the out-turned flanges 37 formed upon the lower ends of the arms 38 of an inverted U-shaped bracket element 39. The bight portion of this bracket element 39 has secured thereto and depending therefrom spaced guide rods 40. Slidably engaged with these guide rods and closely fitting the same are tubular slides 41 to the lower ends of which is secured a horizontal platform 42.

The output shaft 25 of the gear train 23 projects at the inner face of the housing 22 and has secured thereto a crank 43 which is connected with an end frame member 44 of the horizontal platform 42 by a link 45. This link is of such length that the platform in its uppermost position or that position which it assumes when the crank 43 is vertical is slightly raised above the upper surface of the tank, as represented by its cover 32 so that for a comparatively long period, the platform 42 is flush or substantially flush with the upper surface of the cover 32 permitting a container 46 carried by this platform to be readily slid from the surface of the platform to the cover of the tank.

In the use of the device, the main tank is filled with the fluid which is to be employed in the treating process and this flued is preferably brought to a temperature of approximately one hundred and ninety degrees to one hundred and ninety-nine degrees as I have found that at this temperature with the short period of immersion employed, the eggs are not overheated and the fluid and oil of suitable character more readily penetrates the shell. Furthermore, at this temperature, the heat is not such as to destroy the properties of the oil employed. It will be obvious that as the motor operates, the output shaft is caused to rotate and because of its crank connection with the platform 42, will raise and lower this platform so that the same is periodically immersed in the fluid together with eggs disposed in receptacles carried thereon. The period of immersion may be controlled by employing the selected pulleys 27 and 28 to receive the drive belt and the arrangement is preferably such that the duration of submergence is in three stages, five, six and seven seconds respectively, as I have found that this range satisfactorily covers the range of difference in texture of the egg shells.

It will, of course, be obvious that the construction hereinbefore set forth is obviously capable of a certain range of change and modification without materially departing from the spirit of the invention and I accordingly do not limit myself to such specific structure except as hereinafter claimed. Particular attention is called to the advantages arising from the use of the inner tank 35 into which the platform 42 dips and which is provided with the perforated or reticulated screens 36. The purpose of this tank with its perforated screens is to prevent the larger body of oil from becoming contaminated and to permit the smaller tank to be readily removed for cleaning and while being removed to be drained of all oil. Even with eggs having thereon no noticeable dirt accumulation, where a great many are run through the oil the oil will pick dirt until eventually there will be from two to three inches of dirt settle on the bottom, and this may be observed when the oil is cold. The heating of the oil, however, sets up such a circulation that this dirt is mixed through the oil and this leaves a soiled appearance on the eggs. Besides this there are bits of excelsior and bits of shells that may have been accidentally broken and these also add to the general accumulation of dirt and make this dirt very objectionable.

It is the purpose of the screens 36 in the inner tank to catch this dirt of all description and remove the dirt from the machine. The removal of the inner tank 35 and the cleansing of dirt therefrom is readily done and with very little labor, but to drain all of the oil from the main tank would consume several hours' labor as well as require several vessels to be used in the operation. When the inner tank 35 is lifted out for cleaning purposes, practically all the oil runs back into the main tank through the screens, which, however, return the dirt within the inner tank and when the inner tank is again inserted it refills with oil through the screens from the main tank. By leaving these screens with their lower edges somewhat above the bottom of the inner tank, a space is left within which the dirt may collect with no danger of its being washed out with the discharge of oil through these screens.

I claim:

1. In a machine for applying preservative fluids to eggs, a tank to contain the fluid, a second tank removably supported from the first named tank and projecting thereinto and having perforated side walls, a support extending over the last named tank and supported from the first named tank, guides projecting downwardly from the support and into the last named tank, members vertically slidable upon said guides, a platform carried by the members and means for vertically reciprocating the platform.

2. In a machine for applying preservative fluids to eggs, a tank to contain the fluid, a second tank removably supported from the first named tank and projecting thereinto and having perforated side walls, a support extending over the last named tank and supported from the first named tank, guides projecting downwardly from the support and into the last named tank, members vertically slidable upon said guides, a platform carried by the members, means for vertically reciprocating the platform including a crank, a link connecting the crank and platform and means for rotating the crank adjustable to regulate the speed of rotation thereof.

3. In a machine for applying preservative fluids to eggs, a tank to contain the fluid, a second tank removably supported from the first named tank and projecting thereinto and having perforated side walls, a support extending over the last named tank and supported from the first named tank, guides projecting downwardly from the support and into the last named tank, members vertically slidable upon said guides, a platform carried by the members, means for vertically reciprocating the platform, said platform at the uppper end of its movement substantially aligning with the top of the first named tank and a cover for the top of the first named tank.

4. In a machine for applying preservative fluids to eggs, a tank to contain the fluid, a second tank removably supported from the first named tank and projecting thereinto and having perforated side walls, a support extending over the last named tank and supported from the first named tank, guides projecting downwardly from the support and into the last named tank, members vertically slidable upon said guides, a platform carried by the members, means for vertically reciprocating the platform, said platform at the upper end of its movement substantially aligning with the top of the first named tank and a cover for the top of the first named tank, said means for vertically reciprocating the platform during continuous operation thereof maintaining the platform substantially stationary for a limited period of time at the upper limit of its movement.

5. In a machine for applying preservative fluids to eggs, a tank to contain the fluid, a support for the tank including a member extending transversely of the top of the tank, a cover for the tank extending between said cross member and one end of the tank, a second tank removably supported within the first named tank between the cross member and the opposite end of the tank and having perforated side walls, a support extending over the second tank and supported from the supports of the first named tank, guides projecting downwardly from the support and into the last named tank, members slidable upon said guides, a platform carried by the member and means for vertically reciprocating the platform.

6. In a machine for applying preservative fluids to eggs, a tank to contain the fluid, a support for the tank including a member extending transversely of the top of the tank, a cover for the tank extending between said cross member and one end of the tank, a second tank removably supported within the first named tank between the cross member and the opposite end of the tank and having perforated side walls, a support extending over the second tank and supported from the supports of the first named tank, guides projecting downwardly from the support and into the last named tank, members slidable upon said guides, a platform carried by the member, means for vertically reciprocating the platform including a gear train, a crank operated from the gear train and a link connecting the crank and said platform.

7. In a machine for applying preservative fluids to eggs, a tank to contain the fluid, a support for the tank, including a member extending transversely of the top of the tank, a cover for the tank extending between said cross member and one end of the tank, a second tank removably supported within the first named tank between the cross member and the opposite end of the tank and having perforated side walls, a support extending over the second tank and supported from the supports of the first named tank, guides projecting downwardly from the support and into the last named tank, members slidable upon said guides, a platform carried by the member, means for vertically reciprocating the platform including a gear train, a crank operated from the gear train, a link connecting the crank and said platform and a motor adjustably connectable with the gear train to thereby regulate the speed of rotation of the crank.

8. A machine for applying preservative fluid to eggs including a main tank, a second tank removably supported within the first tank and having screens in its walls, an egg supporting platform movable into or out of the inner tank, and means whereby the egg supporting platform may be immersed in or removed from the inner tank.

9. In a machine for applying preservative fluids to eggs, a main tank to contain the fluid, a second tank removably supported upon the first named tank and extending downward thereinto and having screens in its side walls, the screens being disposed with their lower edges above the bottom of the inner tank, and power operated means for alternately lowering and raising the egg support into or out of the inner tank.

10. In a machine for applying preservative fluids to eggs, a tank to contain the fluid, a second tank removably supported upon the first named tank and extending downward thereinto and having perforated side walls, an egg support movable vertically into or out of said last named tank, a motor, means operatively connecting the motor to the means for raising or lowering the egg support, and means for varying the ratio between the speed of the motor and the speed of reciprocations of the egg support.

In testimony whereof I hereunto affix my signature.

ELMER E. ANDERSON.